United States Patent [19]
Ablay et al.

[11] Patent Number: 5,970,416
[45] Date of Patent: Oct. 19, 1999

[54] PROVISION OF DISTRIBUTED CALL HANDLING OVER A PLURALITY OF NETWORK NODES

[75] Inventors: Sewim Fewsi Ablay, West Dundee; Randy L. Ekl, Lake Zurich; Robert J. Novorita, Orland Park, all of Ill.

[73] Assignee: Motorola, Schaumburg, Ill.

[21] Appl. No.: 08/690,666

[22] Filed: Jul. 31, 1996

[51] Int. Cl.⁶ .................................................. H04B 7/00
[52] U.S. Cl. ........................... 455/510; 455/445; 455/450
[58] Field of Search ............................ 455/16, 422, 424, 455/426, 439, 450, 517, 524, 561, 445, 8

[56] References Cited

U.S. PATENT DOCUMENTS

| | | | |
|---|---|---|---|
| 2,699,495 | 1/1955 | Magnuski et al. ........................... | 455/8 |
| 4,611,096 | 9/1986 | Asmuth et al. . | |
| 5,257,406 | 10/1993 | Ito ........................................... | 455/445 |
| 5,276,911 | 1/1994 | Levine et al. ........................... | 455/510 |
| 5,309,512 | 5/1994 | Blackmon et al. . | |
| 5,459,761 | 10/1995 | Monica et al. . | |
| 5,551,056 | 8/1996 | Koponen et al. ........................... | 455/8 |

FOREIGN PATENT DOCUMENTS

| | | |
|---|---|---|
| 2 206 019 | 6/1988 | United Kingdom . |
| WO 9605675A1 | 2/1996 | WIPO . |

*Primary Examiner*—Reinhard J. Eisenzopf
*Assistant Examiner*—Sam Bhattacharya
*Attorney, Agent, or Firm*—Susan L. Lukasik

[57] ABSTRACT

The following describes an apparatus for and method of providing and supporting distributed call handling over a plurality of network nodes (401, 403, 405, 407, 409, 411, 413) in a communication system, wherein the network nodes (401, 403, 405, 407, 409, 411, 413) are found in each device with the system, rather than only in the repeaters (101, 103, 105, 107, 109), the site controller (111), or the zone controller (ZC) for the system. The call establishment process is provided as elements (301, 303, 305, 307, 309, 311, 313) of a state machine. Each of the elements (301, 303, 305, 307, 309, 311, 313) is distributed over one or more of the plurality of network nodes (401, 403, 405, 407, 409, 411, 413). If one of the network nodes becomes unavailable, the element(s) supported by the now unavailable network node is reassigned (705, 809), as necessary.

28 Claims, 4 Drawing Sheets

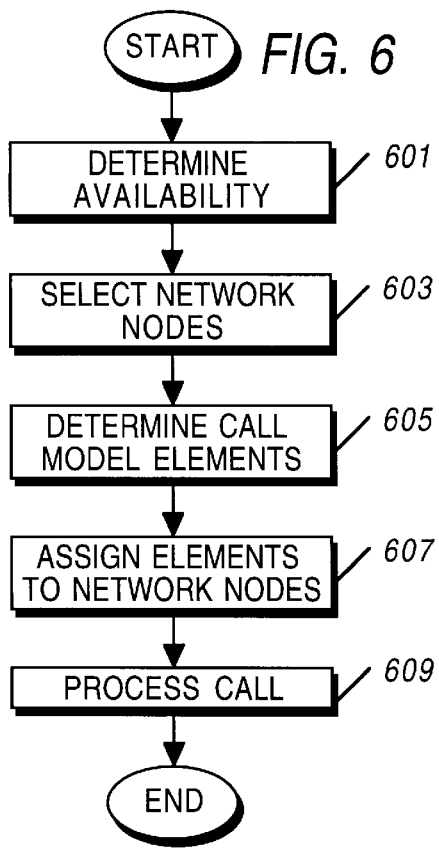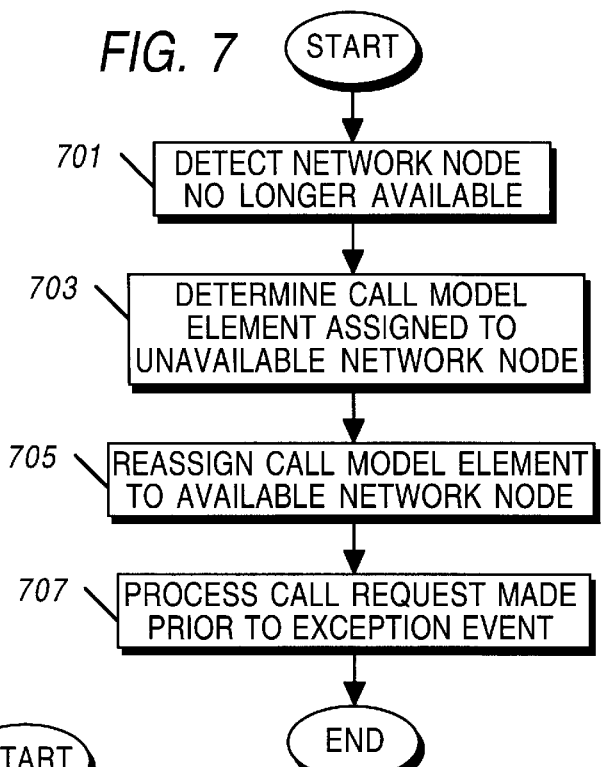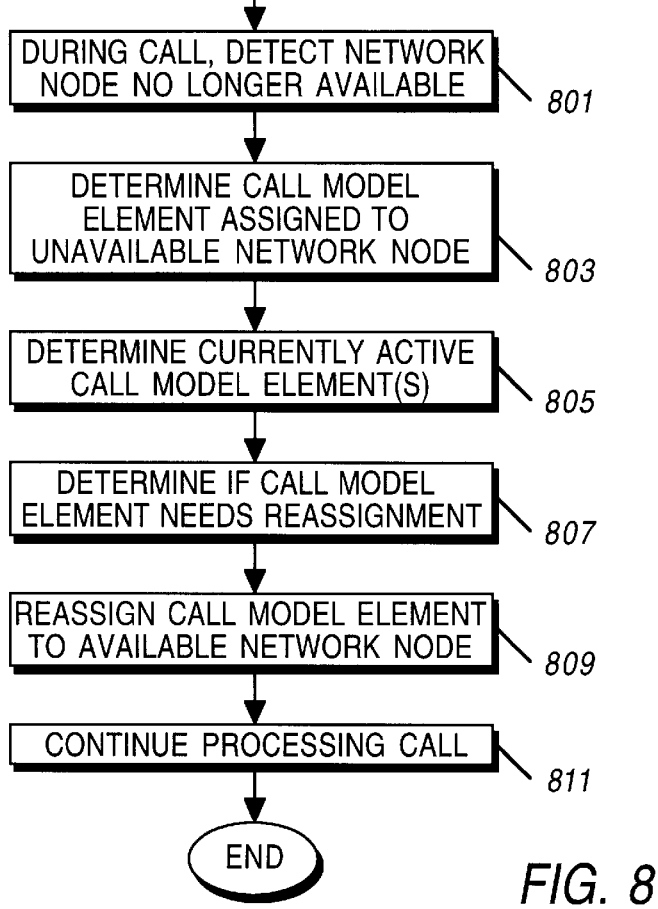
FIG. 6
FIG. 7
FIG. 8

PROVISION OF DISTRIBUTED CALL HANDLING OVER A PLURALITY OF NETWORK NODES

FIELD OF THE INVENTION

This invention relates to communication systems, including but not limited to trunked radio frequency (RF) communication systems.

BACKGROUND OF THE INVENTION

The basic operation and structure of a land mobile radio system is well known. Land mobile radio systems typically comprise one or more radio communication units and one or more repeaters that transceive information via radio frequency (RF) communication resources. These communication resources may be narrow band frequency modulated channels, time division multiplex slots, frequency pairs, and so forth, which are sourced by a plurality of repeaters or base stations. Land mobile radio systems may be organized as trunked communication systems, where a plurality of communication resources is allocated amongst a group of users by assigning the repeaters on a communication-by-communication basis with an RF coverage area. In addition, calls made from RF communication units to landline telephones may also be placed through the use of switches connected to the PSTN (Public Switched Telephone Network) and the repeaters that source the RF communication resources.

Generally, trunked two-way RF communication systems provide mobile and portable communication units with wireless services similar to many wired communication networks. Such examples include full-duplex telephone voice communication, two-way mobile-to-mobile group dispatch communication, and two-way mobile-to-dispatcher group dispatch communication. A typical trunked communication system site, where each different site has a different physical location, is composed of a number of full-duplex repeaters, each coupled to a variety of devices to support interconnection to the public telephone network, mobile-to-mobile calling, and to one or more dispatcher console positions. These devices typically provide a centralized control for the repeaters. For example, a single central controller provides radio channel signalling encode and decode functions, authorization functions, resource determination functions, and communication activity logging A single telephone interconnect switch typically provides the repeaters with an interface to one or more telephone lines to support telephone interconnect communication. In systems employing a single device that is shared among the repeaters, a failure of the single device may render one or more of the desired services or functions inoperable, thus impairing communications in the system. Placing redundant devices within the system is expensive and an inefficient use of space and resources.

Accordingly, there is a need for a communication system that efficiently covers a large area while providing dynamic and flexible allocation of distributed call control functions. There is also a need for a communication system that provides recovery for failed network nodes.

BRIEF DESCRIPTION OF THE DRAWINGS

FIG. 6 is a flowchart describing a method of providing distributed call handling over a plurality of network nodes in accordance with the invention.

FIG. 7 is a flowchart of a method of supporting distributed call handling when an exception condition event occurs in accordance with the invention.

FIG. 8 is a flowchart of method of supporting distributed call handling when an exception condition event occurs during a call in accordance with the invention.

DESCRIPTION OF A PREFERRED EMBODIMENT

Figure 1:
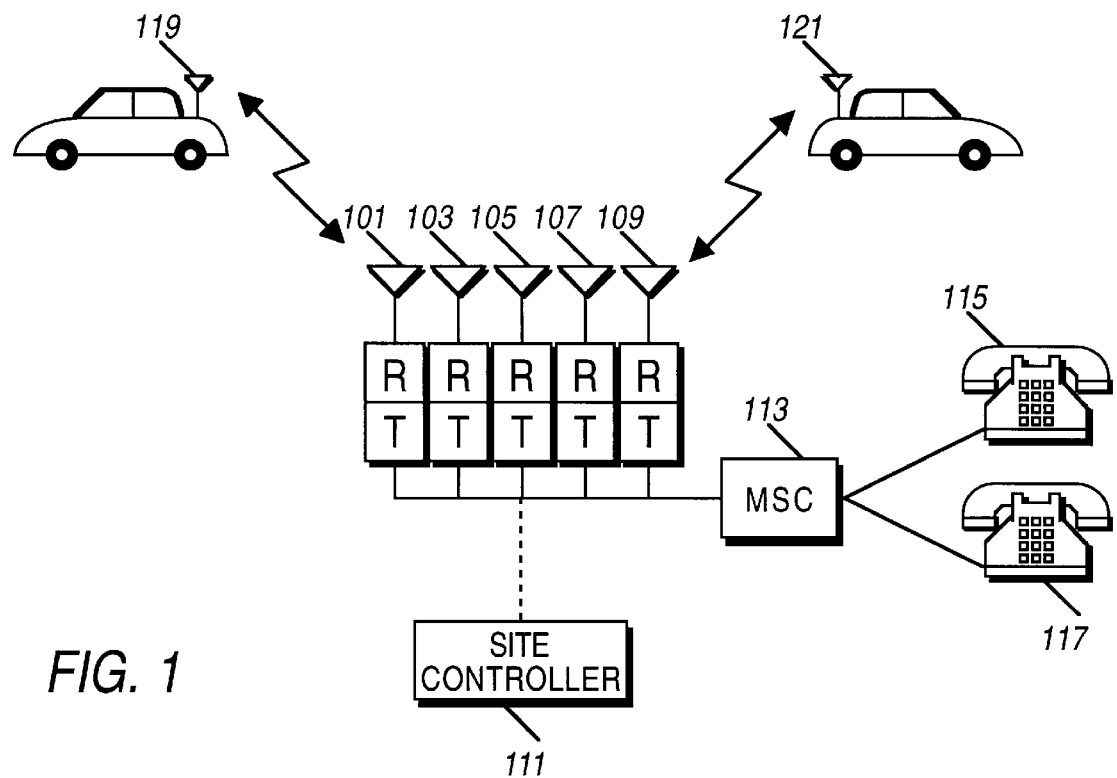
FIG. 1 is a block diagram of a wireless communication system that comprises a single site in accordance with the invention.

The following describes an apparatus for and method of providing and supporting distributed call handling over a plurality of network nodes in a communication system, wherein the network nodes are found in each device within the system, rather than in the repeaters, the site controller, or the zone controller for the system. The call establishment and control process is provided as elements of a state machine. Each of the elements is distributed over one or more of the plurality of network nodes. If one of the network nodes becomes unavailable, the element(s) supported by the now unavailable network node is reassigned, as necessary.

A method of providing distributed call handling over a plurality of network nodes, wherein each of the plurality of network nodes is capable of handling one or more of a plurality of call model elements from a call model, comprises the steps of selecting at least two of the plurality of network nodes over which to distribute a plurality of call model elements, yielding at least two selected network nodes. Each the plurality of call model elements is assigned to the at least two selected network nodes, yielding a call model assignment. Using the call model assignment, a call is processed in response to a call request. Optionally, it may be determined which of the plurality of network nodes are available before the step of selecting. In addition, a first of the at least two selected network nodes may have a call processing capability that a second of the at least two selected network nodes does not have. The plurality of network nodes may be geographically distributed among a plurality of sites.

In an additional embodiment, an exception condition event occurs, and the process further comprises the steps of detecting that at least one of the selected network nodes is not currently available, yielding at least one unavailable network node. Which of the plurality of call model elements is assigned to the at least one unavailable network node is determined, yielding at least one unassigned element. The at least one unassigned call model element is reassigned to at least one of the plurality of network nodes which is not the at least one unavailable network node, yielding a modified call model assignment. Using the modified call model assignment, a call is processed in response to a call request made prior to the exception condition event. The reassigning may be based upon an algorithm that minimizes a network parameter, such as wireless traffic or wireline traffic between the plurality of network nodes.

In another embodiment, an exception condition event occurs during a call, and the process further comprises the steps of detecting, during the call, that at least one of the selected network nodes has become unavailable, yielding at least one unavailable network node. Which of the plurality of call model elements is assigned to the at least one unavailable network node is determined, yielding at least one unassigned element. Which of the plurality of call model elements is currently active is determined, yielding a currently active element. If the at least one unassigned element needs to be reassigned is then determined. If the at least one unassigned element needs to be reassigned, the at least one unassigned element is reassigned to at least one of the plurality of network nodes which is not the at least one unavailable network node, yielding a modified call model assignment. Using the modified call model assignment, the call is continued to be processed. In addition, the step of determining if the at least one unassigned element needs to be reassigned comprises the steps of determining if the at least one unassigned element occurs after the currently active element in the call model assignment and if the at least one unassigned element occurs after the currently active element in the call model assignment, determining that reassignment of the at least one of the plurality of call model elements is necessary. If the at least one unassigned element occurs before the currently active element in the call model assignment, reassignment of the at least one of the plurality of call model elements is determined to be unnecessary.

The apparatus comprises a plurality of network nodes, arranged and constructed to provide at least one element of a plurality of elements of a state machine, which is devised to process a call request, wherein a first of the plurality of network nodes provides a first element of the plurality of elements and a second of the plurality of network nodes does not provide the first element. Optionally, the plurality of network nodes may comprise at least one data storage node; at least one service control node coupled to the at least one data storage node; at least one switch node coupled to the at least one service control node; at least one resource node coupled to the at least one service control node and the switch node; and at least one subscriber node coupled to the at least one resource node.

Additionally, the at least one data storage node and/or the at least one service control node may provide a service authorization element of the plurality of elements. The at least one switch node and/or the at least one service control node may provide a process request element of the plurality of elements. The at least one resource node and/or the at least one subscriber node may provide an active call element of the plurality of elements. The at least one service control node may provide a call termination element of the plurality of elements.

A block diagram of a wireless communication system comprising a plurality of repeaters 101, 103, 105, 107, and 109 and an optional site controller 111 is connected via a wireline to a master switching center (MSC) 113 at a single site as shown in FIG. 1. This system infrastructure provides communications between RF communication units 119 and 121 and/or land line communication units 115 and 117. In prior systems, when a call request is received by a system, a site controller 111 may process and control the entire call establishment process, including setting up the call, allocating communication resources and switches necessary to connect one user to another user within the system, authorization, call logging, and so forth. Other systems distribute these call processing functions amongst one or more intelligent repeaters 101, 103, 105, 107, and 109 in systems where no site controller is present.

Figure 2:
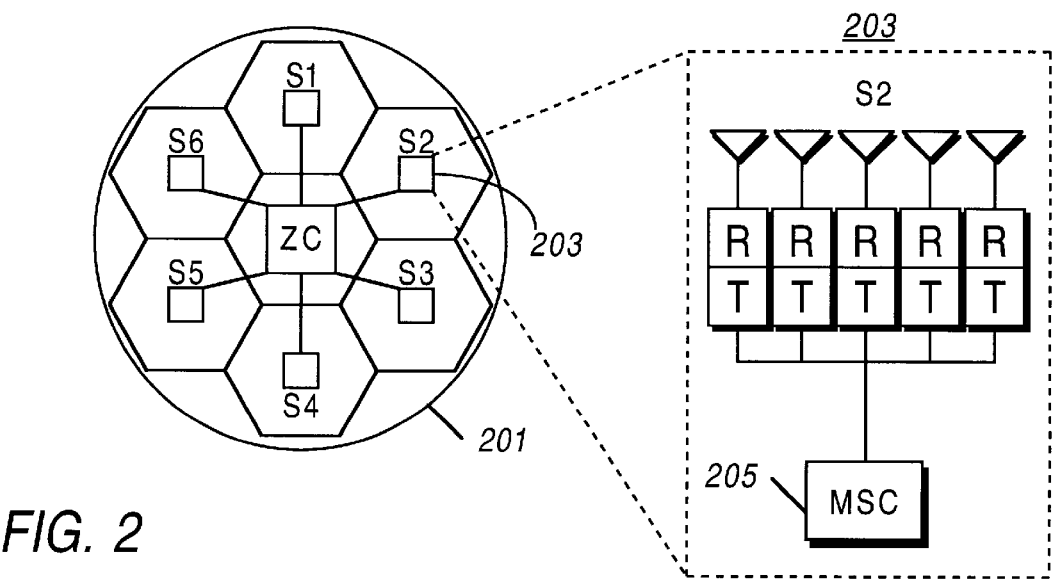
FIG. 2 is a block diagram of a wireless communication system comprising multiple sites in accordance with the invention.

Larger systems comprised of multiple sites, such as the system shown in FIG. 2, provide communications to a larger coverage area 201 and use a zone controller (ZC) to control interactions between the various sites S1, S203, S3, S4, S5, and S6. In previous communications systems, call processing control and information distribution has been provided by any combination of intelligent repeaters, site controllers, and zone controllers.

The present invention provides a method of supporting distributed call handling over a plurality of network nodes. Each of the plurality of network nodes is capable of handling one or more of a plurality of call model elements from a call model. A call model is a functional abstraction providing rules of representing and handling service processing interactions that support multiple instances of a single call.

Figure 3:
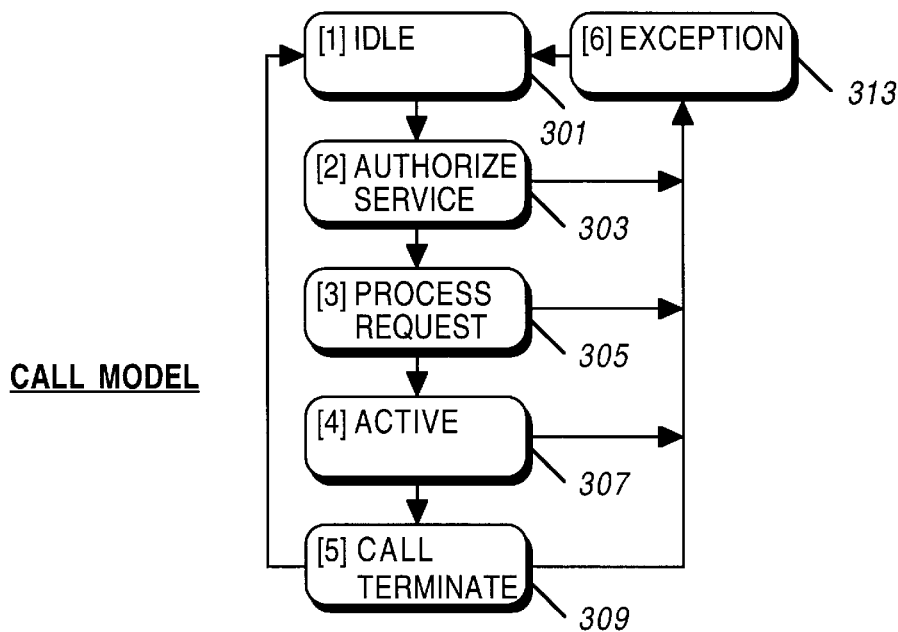
FIG. 3 is an example of a call model in accordance with the invention.

An example of a call model is shown in FIG. 3, which shows six call model elements. Each of the call model elements is part of a state machine that has six elements in the preferred embodiment. The first call model element 301 is the idle state [1], in which the disconnection and clearing of previous calls is handled in the preferred embodiment. In the absence of a call request, the call model remains active in this state [1] in the preferred embodiment.

The second call model element 303 is the service authorization state [2], entered upon receipt of a message from an originating end user indicating the desire to invoke a service In the preferred embodiment, the service authorization state [2] is described as follows. At this point, it is determined whether the requesting user is authorized to access the requested service or whether the requested service is supported by the system. This state [2] is exited normally when it is determined that the user is authorized for the service. An exception condition event occurs at this call model element 303 if the call control function determines that the user of the service is not authorized.

The third call model element 305 is the process request state [3]. In the preferred embodiment, the process request state [3] is described as follows. This element 305 is entered upon successful authorization, from state [2] and determines the appropriate sites and connections thereto required for the call. This state [3] is exited normally when a message is received from the originating MSC. An exception condition event occurs at this call model element in the event that not all sites or connections requested are, in fact, possible.

The fourth call model element 307 is the active state [4], wherein the call actively takes place. In the preferred embodiment, the active state [4] is described as follows. This state [4] is entered when a confirmation is received from all participating sites. This state [4] is exited normally when a call terminate message is received from one of the MSCs participating in the call. An exception condition event occurs at this call model element 307 in the event that, for example, a connection fails.

The fifth call model element 309 is the call terminate state [5]. In the preferred embodiment, the call terminate state [5] is described as follows. This state [5] is entered when a release message is received from the originating MSC. This state [5] is exited normally when a message stating that the resources allocated to the call are de-allocated is received from the MSC's participating in the call. An exception condition event occurs at this call model element 309 in the event that, for example a call timer expires without a disconnect message being received.

The sixth call model element 313 is the exception state [6], entered when an exception condition event occurs in one of the other call model states, requiring additional functions or steps to take place in order to maintain processing of the current instance of the call model. An exception condition event is a stimulus that is different from the normal, expected stimulus at the present state of the call processing model. Examples include connection busy (instead of connection available), service not authorized (instead of service authorized), and so forth, as described above.

Figure 4:
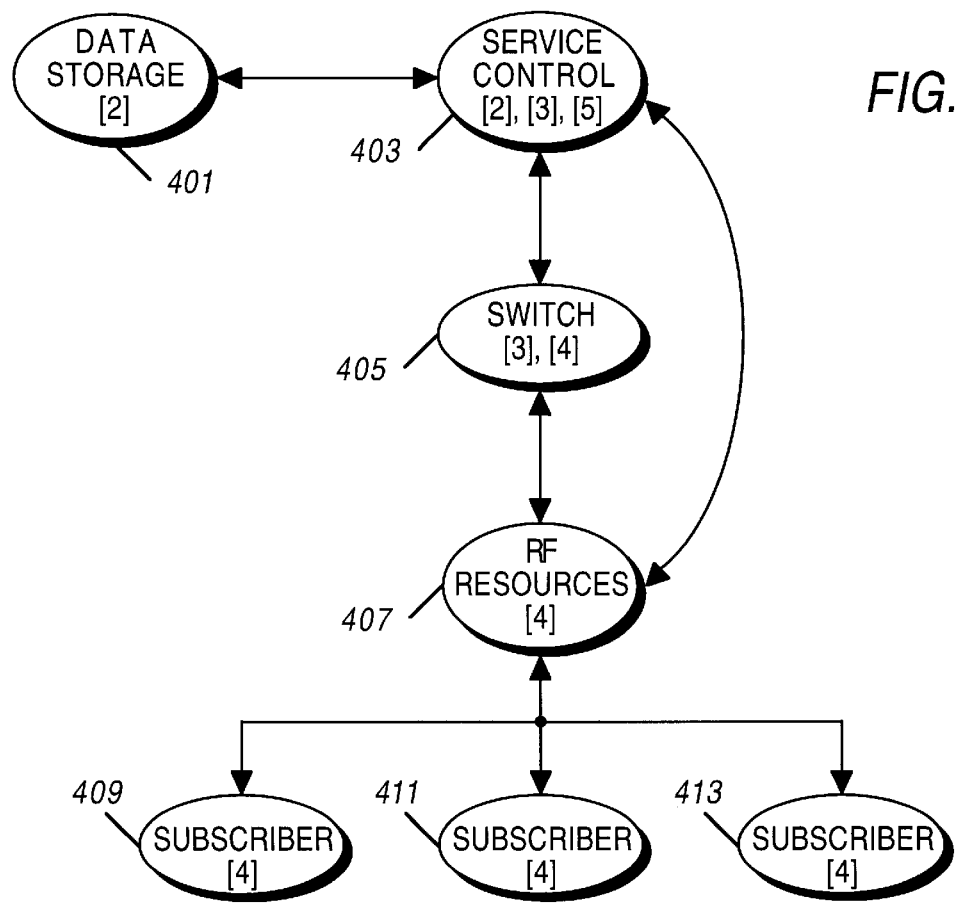
FIG. 4 is a network functional diagram showing the allocation of call model elements to network nodes for a call in accordance with the invention.

FIG. 4 is a network functional diagram showing network nodes for a call, among which network nodes the call elements are distributed. In the preferred embodiment, the call model elements are processed in order from one through six, unless an exception condition occurs, and the controlling point for the call resides in the network node currently providing the service for the element or state of the state machine that is the call model. The service authorization state [2] may take place either in a data storage node 401, as may reside in a database that may be attached to a site controller 111, a zone controller ZC, or a bank of intelligent repeaters 101, 103, 105, 107, and 109 or residing with site 203. The authorization of service state [2] may also be performed in the service control node 403, which node may reside in a site controller(s) 111, zone controller(s) ZC, or intelligent repeater(s) 101, 103, 105, 107, and 109. A third point of control is the switch node 405, which resides in the master switch center (MSC). The request processing state [3] may be performed either at the switch node 405 or the service control node 403. The active call state [4] is controlled by the switch node 405 and/or the RF resource node(s) 407, as well as the subscriber node(s) 409, 411, and/or 413. The subscriber nodes 409, 411, and 413 include any subscriber, i.e., communication units, that may be involved in the call. The call termination state [5] is controlled by the service control node 403.

Figure 5:
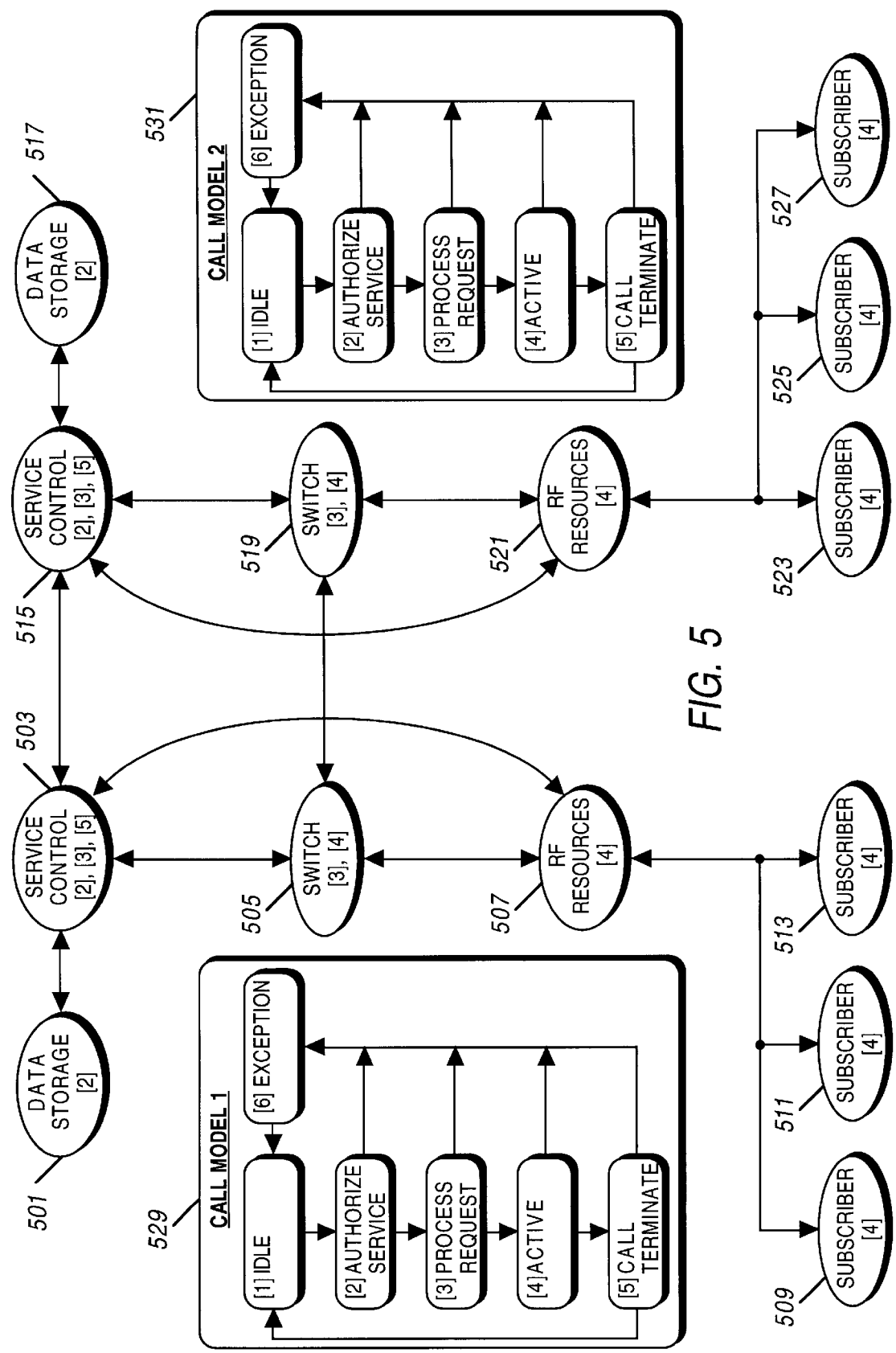
FIG. 5 is a network functional diagram showing the allocation of the elements of two call models provided in two different communication sites for a single call in accordance with the invention.

A network functional diagram of two call models provided in two different communication sites for a single call is shown in FIG. 5. The call shown may be in two different sites in the same zone or in different zones of a communication system. Communication between the service control network nodes 503 and 515 as well as communication between the switch network nodes 505 and 519 provide for the ability to control a call across multiple sites or multiple zones while still maintaining a single point of control anywhere within the two sites and without the need to rely on a single site or group of sites to maintain complete and total control of the call at all times.

A flowchart describing a method of supporting normal distributed call handling over a plurality of network nodes is shown in the flow chart of FIG. 6. At step 601, an optional step, the availability of each of the plurality of network nodes is determined. Step 601 entails a network process which determines of all assignable nodes by methods known in the art, such as polling, the operational status, i.e., active, idle, or disabled. At step 603, at least two of the plurality of network nodes 401, 403, 405, 407, 409, 411, and 413 are selected for distribution of the plurality of call model elements. At step 605, the call model elements to be distributed are determined. At step 607, each of the plurality of call model elements is assigned to at least one of the plurality of network nodes, thereby yielding a call model assignment. At step 609, the call model assignment is used to process a call in response to a call request from a communication unit 115 or 119. The functions of FIG. 6, FIG. 7, and FIG. 8 are performed by the zone controller in the preferred embodiment.

A method of supporting distributed call handling when an exception condition event occurs is shown in the absence of a call request in the flowchart of FIG. 7. An exception condition event is described above with respect to element 313 of FIG. 3. At step 701, an exception condition event is detected by a network process that determines all assignable network nodes by methods known in the art, such as polling, the operational status, i.e., active, idle, or disabled, wherein one or more network nodes 401, 403, 405, 407, 409, 411, 413 are no longer available for service and are designated as unavailable network nodes. For example, a currently unavailable node is a node that was previously available but currently is considered unavailable because of a hardware failure, a software failure, a power failure, removal from the system, or other unavailability. Such detection may be performed by an intelligent repeater, site controller, or zone controller periodically polling each network node to be sure that each network node is still operational. At step 703, it is determined which of the call model elements was previously assigned to the network node that was determined to be unavailable at step 701. At step 705, the call model elements that were assigned to the now unavailable network node are reassigned to one of the network nodes that is currently available, i.e., a network node that is not determined as unavailable at step 701. The reassigning may be based upon an algorithm that minimizes a network parameter such as call busy queues, call throughput, or access delays. The result of step 705 is a modified call model assignment. At step 707, a call request made prior to the exception condition event is processed using the modified call model assignment.

A method of supporting distributed call handling when an exception condition event occurs during a call is shown in the flowchart of FIG. 8. At step 801, during a call, i.e., when the state machine of FIG. 3 is not in the idle state [1], it is detected if a network node is no longer available, as described with respect to step 701. At step 803, it is determined which of the call model elements was previously assigned to the network node that was determined to be unavailable at step 801. At step 805, the currently active call element is determined. The currently active call element is most likely the active call state [4], but may be the service authorization state [2], request processing state [3], the call terminatation state [4], or the exception state [6]. At step 807, it is determined that if the call model element needs to be reassigned to an available network node. Such a determination may be made by first determining if at least one of the plurality of call model elements occurs after the currently active element in the state machine. For example, the process request state [3] occurs after the authorization of service state [2], i.e., the number of the state machine element determines if one element occurs after another, as, e.g., 4 occurs after 3. If the call model element (that was provided by the network node that became unavailable at step 801) occurs after the currently active element, it is determined that reassignment of that call model element is necessary. If the call model element (that was provided by the network node that became unavailable at step 801) occurs before the currently active element, it is determined that reassignment of that call model element is unnecessary. At step 809, the call model element is reassigned to an available network node if it is determined that such reassignment is necessary at step 807, yielding a modified call assignment. At step 811, the modified call model assignment, as provided in step 809, is used to continue processing the call. If reassignment was not required at step 809, the call is processed using an unmodified call model.

Advantages of this invention over prior communication systems include increased communication service availability and quality, reduction of unnecessarily replicated network functionality, decreased sensitivity to single-point network node failures whether or not engaged in a service, the ability to rapidly provision new network nodes for operation, dynamically and flexibly allocate call model elements to network nodes for processing of the call, and to dynamically re-allocate call model elements to network nodes for recovery and continued processing of the call in exception and fault condition situations.

What is claimed is:

1. A method of providing distributed call handling over a plurality of network nodes, wherein each of the plurality of network nodes is capable of handling one or more of a plurality of call model elements from a call model, comprising the steps of:
   A) selecting at least two of the plurality of network nodes over which to distribute a plurality of call model elements, yielding at least two selected network nodes, wherein at least one of the at least two selected network nodes is not a repeater;
   B) assigning each of the plurality of call model elements to the at least two selected network nodes, yielding a call model assignment; and
   C) using the call model assignment to process a call in response to a call request.

2. The method of claim 1, wherein a first of the at least two selected network nodes has a call processing capability that a second of the at least two selected network nodes does not have.

3. The method of claim 1, further comprising the step of determining which of the plurality of network nodes are available before the step of selecting.

4. The method of claim 1, wherein the plurality of network nodes is geographically distributed among a plurality of sites.

5. The method of claim 1, wherein an exception condition event occurs, further comprising the steps of:
   A) detecting that at least one of the selected network nodes is not currently available, yielding at least one unavailable network node;
   B) determining which of the plurality of call model elements is assigned to the at least one unavailable network node, yielding at least one unassigned element;
   C) reassigning the at least one unassigned call model element to at least one of the plurality of network nodes which is not the at least one unavailable network node, yielding a modified call model assignment; and
   D) using the modified call model assignment to process a call in response to a call request made prior to the exception condition event.

6. The method of claim 5, wherein the step of reassigning is based upon an algorithm that minimizes a network parameter.

7. The method of claim 6, wherein the network parameter is wireless traffic.

8. The method of claim 6, wherein the network parameter is wireline traffic between the plurality of network nodes.

9. The method of claim 1, wherein an exception condition event occurs during a call, further comprising the steps of:
   A) detecting, during the call, that at least one of the selected network nodes has become unavailable, yielding at least one unavailable network node;
   B) determining which of the plurality of call model elements is assigned to the at least one unavailable network node, yielding at least one unassigned element;
   C) determining which of the plurality of call model elements is currently active, yielding a currently active element;
   D) determining if the at least one unassigned element needs to be reassigned;
   E) if the at least one unassigned element needs to be reassigned, reassigning the at least one unassigned element to at least one of the plurality of network nodes which is not the at least one unavailable network node, yielding a modified call model assignment; and
   F) using the modified call model assignment to continue processing the call.

10. The method of claim 9, wherein the step of determining if the at least one unassigned element needs to be reassigned comprises the steps of:
    determining if the at least one unassigned element occurs after the currently active element in the call model assignment; and
    if the at least one unassigned element occurs after the currently active element in the call model assignment, determining that reassignment of the at least one of the plurality of call model elements is necessary.

11. The method of claim 10, wherein if the at least one unassigned element occurs before the currently active element in the call model assignment, determining that reassignment of the at least one of the plurality of call model elements is unnecessary.

12. A method comprising the steps of:
    A) assigning each of a plurality of call model elements to at least two selected network nodes of a plurality of network nodes, yielding a call model assignment, wherein at least one of the at least two selected network nodes is not a repeater;
    B) detecting that at least one of the at least two selected network nodes is not currently available, yielding at least one unavailable network node;
    C) determining which of the plurality of call model elements is assigned to the at least one unavailable network node, yielding at least one unassigned element;
    D) reassigning the at least one unassigned call model element to at least one of the plurality of network nodes which is not the at least one unavailable network node, yielding a modified call model assignment; and
    E) using the modified call model assignment to process a call in response to a call request made prior to an exception condition event.

13. The method of claim 12, wherein the step of reassigning is based upon an algorithm that minimizes a network parameter.

14. The method of claim 13, wherein the network parameter is wireless traffic.

15. The method of claim 13, wherein the network parameter is wireline traffic between the plurality of network nodes.

16. A method comprising the steps of:
    A) assigning each of a plurality of call model elements to at least two selected network nodes of a plurality of network nodes, yielding a call model assignment;
    B) detecting, during the call, that at least one of the at least two selected network nodes has become unavailable, yielding at least one unavailable network node;
    C) determining which of the plurality of call model elements is assigned to the at least one unavailable network node, yielding at least one unassigned element;

D) determining which of the plurality of call model elements is currently active, yielding a currently active element;

E) determining if the at least one unassigned element needs to be reassigned;

F) if the at least one unassigned element needs to be reassigned, reassigning the at least one unassigned element to at least one of the plurality of network nodes which is not the at least one unavailable network node, yielding a modified call model assignment; and G) using the modified call model assignment to continue processing the call.

17. The method of claim 16, wherein the step of determining if the at least one unassigned element needs to be reassigned comprises the steps of:

determining if the at least one unassigned element occurs after the currently active element in the call model assignment; and if the at least one unassigned element occurs after the currently active element in the call model assignment, determining that reassignment of the at least one of the plurality of call model elements is necessary.

18. The method of claim 17, wherein if the at least one unassigned element occurs before the currently active element in the call model assignment, determining that reassignment of the at least one of the plurality of call model elements is unnecessary.

19. An apparatus comprising a plurality of network nodes, arranged and constructed to provide at least one element of a plurality of elements of a state machine, which is devised to process a call request, wherein a first of the plurality of network nodes provides a first element of the plurality of elements and a second of the plurality of network nodes does not provide the first element, and wherein at least one of the first of the plurality of network nodes and the second of the plurality of network nodes is not a repeater, and wherein the state machine provides the elements of a call model that has a controlling point for the call, and the controlling point resides in the network node currently providing the call model element that is active, such that when the active call model element changes from residing in a first network node to residing in a second network node, the controlling point changes from the first network node to the second network node during a single call.

20. The apparatus of claim 19, wherein the plurality of network nodes comprises:

at least one data storage node;

at least one service control node coupled to the at least one data storage node;

at least one switch node coupled to the at least one service control node;

at least one resource node coupled to the at least one service control node and the switch node; and at least one subscriber node coupled to the at least one resource node.

21. The apparatus of claim 20, wherein the at least one data storage node and/or the at least one service control node provide a service authorization element of the plurality of elements.

22. The apparatus of claim 20, wherein the at least one switch node and/or the at least one service control node provide a process request element of the plurality of elements.

23. The apparatus of claim 20, wherein the at least one resource node and/or the at least one subscriber node provide an active call element of the plurality of elements.

24. The apparatus of claim 20, wherein the at least one service control node provides a call termination element of the plurality of elements.

25. The method of claim 1, wherein the call model has a controlling point for the call, and the controlling point resides in the network node currently providing the call model element that is active, such that when the active call model element changes from residing in a first network node to residing in a second network node, the controlling point changes from the first network node to the second network node during a single call.

26. The method of claim 12, wherein the call model elements form a call model that has a controlling point for the call, and the controlling point resides in the network node currently providing the call model element that is active.

27. A method of providing distributed call handling over a plurality of network nodes, wherein each of the plurality of network nodes is capable of handling one or more of a plurality of call model elements from a call model, comprising the steps of:

selecting at least two of the plurality of network nodes over which to distribute the plurality of call model elements, yielding at least two selected network nodes;

assigning each of the plurality of call model elements to the at least two selected network nodes, yielding a call model assignment; and using the call model assignment to process a call in response to a call request, wherein the call model has a controlling point for the call, and the controlling point resides in the network node currently providing the call model element that is active, such that when the active call model element changes from residing in a first network node to residing in a second network node, the controlling point changes from the first network node to the second network node during a single call.

28. The method of claim 27, wherein the plurality of network nodes comprises:

a service control node that provides at least one of a service authorization state, a process request state, and a call terminate state;

a switch node that provides at least one of the process request state and an active state; and a radio frequency resource node that provides an active state.

* * * * *